(12) United States Patent
Mostafavi et al.

(10) Patent No.: US 11,474,509 B2
(45) Date of Patent: Oct. 18, 2022

(54) SYSTEM AND METHOD FOR CASUAL INFERENCE IN MANUFACTURING PROCESS

(71) Applicant: Palo Alto Research Center Incorporated, Palo Alto, CA (US)

(72) Inventors: Saman Mostafavi, San Francisco, CA (US); Ajay Raghavan, Mountain View, CA (US); Hong Yu, San Jose, CA (US); Deokwoo Jung, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/326,149

(22) Filed: May 20, 2021

(65) Prior Publication Data
US 2022/0035354 A1 Feb. 3, 2022

Related U.S. Application Data

(60) Provisional application No. 63/060,524, filed on Aug. 3, 2020.

(51) Int. Cl.
*G05B 19/418* (2006.01)
*G06K 9/62* (2022.01)
*G06N 5/04* (2006.01)

(52) U.S. Cl.
CPC ... *G05B 19/41885* (2013.01); *G05B 19/4183* (2013.01); *G05B 19/4184* (2013.01); *G06K 9/6224* (2013.01); *G06N 5/04* (2013.01)

(58) Field of Classification Search
None
See application file for complete search history.

(56) References Cited

U.S. PATENT DOCUMENTS

2020/0103888 A1 4/2020 Sayyarrodsari

OTHER PUBLICATIONS

Jonas Peters et al: "Casual Inference on Discrete Data using Additive Noise Models", arxiv.org, Cornell University Ithaca NY 14853, Nov. 2, 2009, XP080375058 DOI: 10.1109/TPAMI.2011.71.

*Primary Examiner* — Carlos R Ortiz Rodriguez
(74) *Attorney, Agent, or Firm* — Yao Legal Services, Inc.; Shun Yao

(57) ABSTRACT

A system and method are provided for determining a causal inference in a manufacturing process. During operation, the system can receive data associated with a processing system which includes a set of interconnected machines and an associated set of processes. The system can generate, based on the data, a graph indicating flows of outputs between the machines as part of the processes. The system can determine, based on a set of variables, one or more candidate clusters in the graph. The system can perform, based on one or more variables of interest, root cause analysis on the one or more candidate clusters by: applying an additive noise model to prune the one or more candidate clusters from the graph; and determining, based on the pruned graph, a candidate pathway likely to cause an issue in at least one process, thereby facilitating improved efficiency in the processing system.

20 Claims, 19 Drawing Sheets

LOG DATA 210

| Machine (211) | Process (212) | Datetime (213) | Lot (214) | Operation Flag (215) | Stop Code (216) | Number Of Products (217) |
|---|---|---|---|---|---|---|
| MA1 | PR1 | 02:04.0 | LO1 | 1 | 1 | 0 |
| MA1 | PR1 | 02:05.0 | LO1 | 1 | 1 | 0 |

290 → To Fig. 2 (cont.)

| Machine | Process | Datetime | Lot | Operation Flag | Stop Code | Number Of Products |
|---|---|---|---|---|---|---|
| MA69 | PR3 | 02:04.0 | LO1 | 1 | 1 | 0 |
| MA69 | PR3 | 02:05.0 | LO1 | 1 | 1 | 0 |
| MA78 | PR3 | 02:06.0 | LO1 | 1 | 1 | 0 |
| MA79 | PR3 | 02:07.0 | LO1 | 1 | 1 | 0 |
| MA91 | PR3 | 02:08.0 | LO1 | 1 | 1 | 0 |
| MA78 | PR3 | 02:09.0 | LO1 | 1 | 1 | 0 |

FIG. 2

MACHINE AND STOPCODE SEQUENCE DATA
220

| Lot | PR1 | PR2 | PR3 | Stopcode_1 | Stopcode_2 | ... | Stopcode_n |
|---|---|---|---|---|---|---|---|
| 7446 | 9 | 37 | 82 | 24 | 46 | | 78 |
| 7453 | 13 | 55 | 69 | 1 | 56 | | 1 |
| 7464 | 22 | 43 | 77 | 0 | 0 | | 69 |
| 7467 | 18 | 54 | 78 | 24 | 24 | | 24 |
| 7469 | 2 | 46 | 87 | 56 | 78 | | 56 |
| 7470 | 17 | 61 | 63 | 78 | 78 | | 78 |
| 7471 | 4 | 33 | 78 | 45 | 45 | | 68 |
| 7472 | 11 | 32 | 91 | 34 | 5 | | 34 |
| 7474 | 16 | 56 | 93 | 1 | 1 | | 1 |
| 7475 | 14 | 59 | 67 | 1 | 1 | | 3 |
| 7477 | 7 | 38 | 90 | 4 | 4 | | 55 |
| 7478 | 10 | 24 | 88 | 4 | 4 | | 4 |
| 7479 | 21 | 57 | 84 | 4 | 3 | | 4 |
| 7480 | 5 | 50 | 78 | 4 | 4 | | 4 |

SYSTEM AND METHOD FOR CASUAL INFERENCE IN MANUFACTURING PROCESS

RELATED APPLICATION

This application claims the benefit of U.S. Provisional Application No. 63/060,524, titled "System and Method for Causal Inference in Manufacturing Process," by inventors Saman Mostafavi, Ajay Raghavan, Hong Yu, and Deokwoo Jung, filed on 3 Aug. 2020, the subject matter of which is related to the subject matter in U.S. application Ser. No. 17/061,248, entitled "System and Method for Determining Manufacturing Plant Topology and Fault Propagation Information," by inventors Hong Yu, Ajay Raghavan, Deokwoo Jung, and Saman Mostafavi, filed 1 Oct. 2020 (hereinafter "U.S. patent application Ser. No. 17/061,248"), which claims the benefit of:

U.S. Provisional Application No. 63/059,446, titled "System and Method for Determining Manufacturing Plant Topology and Fault Propagation Information," by inventors Hong Yu, Ajay Raghavan, Deokwoo Jung, and Saman Mostafavi, filed on 31 Jul. 2020, and is further related to U.S. application Ser. No. 17/068,613, entitled "System and Method for Constructing Fault-Augmented System Model for Root Cause Analysis of Faults in Manufacturing Systems," by inventors Hong Yu, Ajay Raghavan, Saman Mostafavi, and Deokwoo Jung, filed 12 Oct. 2020 (hereinafter "U.S. patent application Ser. No. 17/068,613"), which application claims the benefit of:

U.S. Provisional Application No. 63/060,522, titled "System and Method for Constructing Fault-Augmented System Model for Root Cause Analysis of Faults in Manufacturing Systems," by inventors Hong Yu, Ajay Raghavan, Saman Mostafavi, and Deokwoo Jung, filed on 3 Aug. 2020, the disclosures of which are incorporated herein by reference in their entirety.

BACKGROUND

Field

This disclosure is generally related to fault diagnosis in a processing system. More specifically, this disclosure is related to a system and method for performing causal inference in a manufacturing process.

Related Art

Modern manufacturing systems can include a network of plurality of machines. Further, in today's manufacturing process an average machine in the manufacturing system can be equipped with multiple sensors for monitoring and reporting various types of signals at sub-hourly intervals. These multiple sensors can monitor and report different types of information which may not be limited to production count, number of defective parts, machine power consumption, machine stop-codes, etc. In such manufacturing systems, identifying and analyzing machine faults can be difficult even for some of the smaller production lines. Furthermore, provided that diagnosis has been solved, i.e., such events have been identified (which can be a difficult to implement), prognosis, i.e., applying preemptive measures to stop such faulty events from happening is a separate problem that can be an extremely challenging task.

SUMMARY

According to one embodiment of the present invention, a system and method is provided for determining a causal inference in a manufacturing process using additive noise models. During operation, the system can receive data associated with a processing system which includes a set of interconnected machines and an associated set of processes. The system can then generate, based on the data, a graph indicating flows of outputs between the machines as part of the processes. The system can determine based on a set of variables, one or more candidate clusters in the graph. A candidate cluster can be provided with one or more variables of interest. The system can perform, based on the one or more variables of interest, root cause analysis on the one or more candidate clusters by: applying, based on the one or more variables of interest, an additive noise model to prune the one or more candidate clusters from the graph; and determining, based on the pruned graph, a candidate pathway likely to cause an issue in at least one process, thereby facilitating improved efficiency in the processing system.

In a variation on this embodiment, the set of variables can include one or more of: an issue associated with a respective machine; a number of times a respective pathway including a group of machines is applied in the processing system; redundant pathways applied; a number of times maintenance event is performed on machines in a respective pathway; and temporal information.

In a further variation on this embodiment, the data can include timestamp information, machine status information, product-batch information, parts processed by different machines.

In a further variation on this embodiment, the product-batch information can comprise a lot number which corresponds to a plurality of physical objects of the processing system. The physical objects can share at least one common characteristic. The machine status information can comprise one or more of an identifier of an issue and a fault type.

In a further variation, the system can provide a feedback, based on the candidate pathway, to indicate one or more root causes for a given stop-code. The system can then display, via a graphical user interface, a visual representation of the feedback. The visual representation of the feedback can include: a pruned graph of the one or more candidate clusters; and a visual representation of a selection of a most likely causal pathway in the pruned graph.

In a variation of this embodiment, the system can determine, based on the additive noise model, a set of scores for each pathway in the one or more candidate clusters. A respective score can indicate a degree of causality associated with a pair of machines in a process flow with respect to a variable of interest. The system can display the set of scores associated with each pathway in the one or more candidate clusters.

In a variation of this embodiment, the processing system can comprise one or more of: a manufacturing system; a cloud computing system; and a supply chain system.

In a variation of this embodiment, the graph can represent a network topology corresponding to the processing system. A respective node in the graph indicates, for a respective output, a machine which processes the respective output, a process associated with the machine, and a stop-code associated with the machine and the process. A respective edge in the graph indicates, for the respective output, a logical flow of a process from an source node to a target node. A number indicated in the respective node in the graph corresponds to a machine number. A weight of the respective edge in the graph can indicate a degree of causality associated with the source node and the target node.

In a variation of this embodiment, the system can receive, via a graphical user interface, a selection of one or more pathways in a visual representation of the graph.

In a variation of this embodiment, the outputs comprise materials and include physical objects upon which the machines of the processing system perform the processes. A respective physical object can be associated with a lot number and a production line of the processing system.

BRIEF DESCRIPTION OF THE FIGURES

In the figures, like reference numerals refer to the same figure elements.

DETAILED DESCRIPTION

Figure 1A:
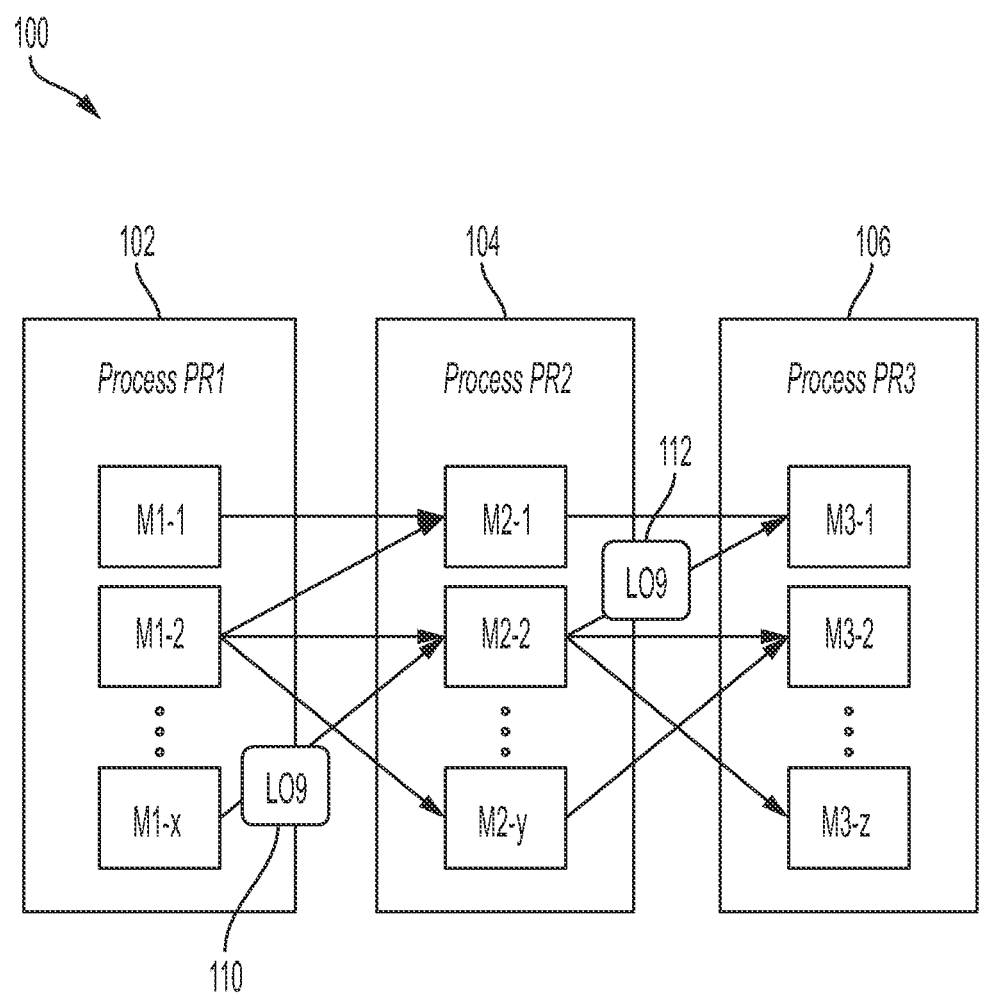
FIG. 1A depicts a diagram of an exemplary flow of materials between machines as parts of different processes, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of identifying production bottlenecks in a factory with a plurality of machines; and determining an impact of these bottlenecks on specific fault modes and the overall downtime associated with a manufacturing process.

Specifically, a system and method are provided that can take into consideration the fact that the data provided by the factory pipeline includes some level of useful information as well as noise and irrelevant data. Based on this consideration, the system can pre-process the data to extract relevant data. In other words, the system can effectively and efficiently extract, from manufacturing log data, relevant information associated with the flow of materials through various processes and multiple machines in a manufacturing system or network. Further, based on the pre-processed data the system may determine a candidate partition in a connectivity graph, thereby facilitating an efficient identification of causal relationships in a factory with a plurality of machines.

In other words, the system may initially create a DAG based on parts processed by different machines and their respective downtimes (may also include features other than downtimes). For example, other features can include number of times maintenance event is performed on machines in a respective pathway; a presence of redundant pathways in the candidate clusters; temporal information; number of times a respective pathway including a group of machines is applied in the processing system. The system can then cluster the DAG based on machine processing similarities of one or more features, i.e., determining one or more candidate clusters based on pre-processed data and one or more features associated with a respective machine. After identifying initial clusters in the DAG, the system may determine the most significant pathways in the clusters and associate certain stop-codes to the determined pathways. In response to associating the stop-codes to the significant pathways, the system may prune the initial clusters in the DAG based on an additive noise model (ANM). Further, the system may apply the ANM to perform a causal inference on the pruned clusters to find major pathways causing the stop-codes. In one embodiment, the system can display via a user-friendly and interactive GUI: the DAG, the pruned DAG, a selection of the major pathways, etc. Therefore, the system can facilitate an efficient causal inference of a failure or malfunction in the manufacturing system by converting a large amount of electronic log data into a user-friendly visualization for quick on-site diagnosis.

The terms "source node" and "target node" refer to a pair of nodes where materials flow, as indicated via a directed edge, from the source node to the target node. For example, materials with a same lot number may flow from a first machine as part of first process (source node) to a second machine as part of a second process (target node), as described below in relation to FIGS. 1A, 1B, and 2.

A "stop event" refers to an unplanned event which causes a manufacturing system to stop for a period of time. A "stop-code" refers to an identifier of an issue associated with a machine or a process in a manufacturing system, and may be (but is not necessarily) associated with a stop event.

The term "machine status information" refers to a condition of a given machine, and can include a stop-code, a fault type, or other indicator or identifier of a stop event.

The term "buffer" refers to a physical buffer or physical bin in which materials may be held for a period of time between machines/processes. The period of time may depend on human-related factors (e.g., when a change of personnel may occur or if the material must be manually moved from one machine to another) or system-related factors (e.g., the performance and usage of machines downstream from or subsequent to a given machine).

The term "machine and stop-code sequence data" refers to manufacturing log data which has been transformed by the system into a format which can be used to generate the graphs described below in relation to FIGS. 2 and 3.

The term "processing system" refers to a system with machines or entities which perform processes resulting in outputs, where those outputs are used as inputs to a next machine or entity as part of a flow, through the processing system, of a respective output from a beginning to an end of the flow. In this disclosure, a manufacturing system, manufacturing log data, and a manufacturing network topology are depicted for purposes of illustration. The described system can include other processing systems, including, but not limited to: distributed parallel computations/simulations in a cloud/cluster computing system or facility; and a delivery/distribution supply chain.

The term "output" refers to a material output or other results derived by a machine or entity performing a process upon the material or output. An output can comprise a physical material or the result of a calculation or simulation.

The terms "partition" and "cluster" are used interchangeably in the present disclosure.

Exemplary Manufacturing Process and Manufacturing Network Topology

FIG. 1A depicts a diagram of an exemplary flow of materials between machines as parts of different processes, in accordance with an embodiment of the present application. Diagram 100 can include a plurality of machines and associated processes, e.g., machines which are involved in a specific process. A process PR1 102 can include actions or processes performed on or by machines M1-1, M1-2, and M1-x; a process PR2 104 can include actions or processes performed on or by machines M2-1, M2-2, and M2-y; and a process PR3 106 can include actions or processes performed on or by machines M3-1, M3-2, and M3-z.

A flow of materials can be indicated by the arrows which are depicted between machines of different processes. A flow of materials can be organized, tracked, or otherwise monitored based on product-batch information, such as a lot number. Further, depending on the type of factory, a system can obtain information about a factory outline and machine connectivity either through a time-sensitive tracking of the processed parts by each machine and/or side information provided by factory workers.

For example, diagram 100 indicates a lot marked by "LO9." This lot represents materials which flow from machine M1-x as part of process PR1 102, to machine M2-2 as part of process PR2 104 (indicated by LO9 110), and finally to machine M3-1 as part of process PR3 106 (indicated by LO9 112). The multiple pathways (of arrows) can indicate the flow of materials over time.

An individual process can correspond to a dedicated function. For example: process PR1 102 can correspond to a process to draw out cables; process PR2 104 can correspond to a process for cutting the cables; and process PR3 106 can correspond to a process for placing connectors on the ends of the cables. Within an individual process, each machine may be involved in a different part of the process. For example, in process PR1 102, machine M1-1 may be used for drawing out cables of a specific diameter of cables or diameters of a varying range, and machine M1-2 may include a redundant machine which may be used to handle jobs greater than a certain volume or threshold. In process PR2 104, machine M2-1 may be used to cut cables of a smaller length or diameter, and machine M2-2 may be used to cut cables of a larger length or diameter, e.g., by using a machine which is sturdier and has the capacity or strength to cut a cable of a thicker diameter or material than the cables cut by machine M2-1.

This is in contrast to a conventional assembly line, in which each machine may be dependent on a single prior machine. The described embodiments may also include redundancy, i.e., in the event that one machine of a process fails, a redundant machine of the same process can take over the job of the failed machine in order to ensure continuity in the production line. Each machine may require different parts from prior machines as part of a prior process. In addition, materials may be placed in a physical buffer (e.g., a bin, sorting bin, or other container) between machines/processes, e.g., after being processed by machine M1-x as a part of process PR1 102, and prior to being processed by machine M2-2 as part of process PR2 104.

Figure 1B:
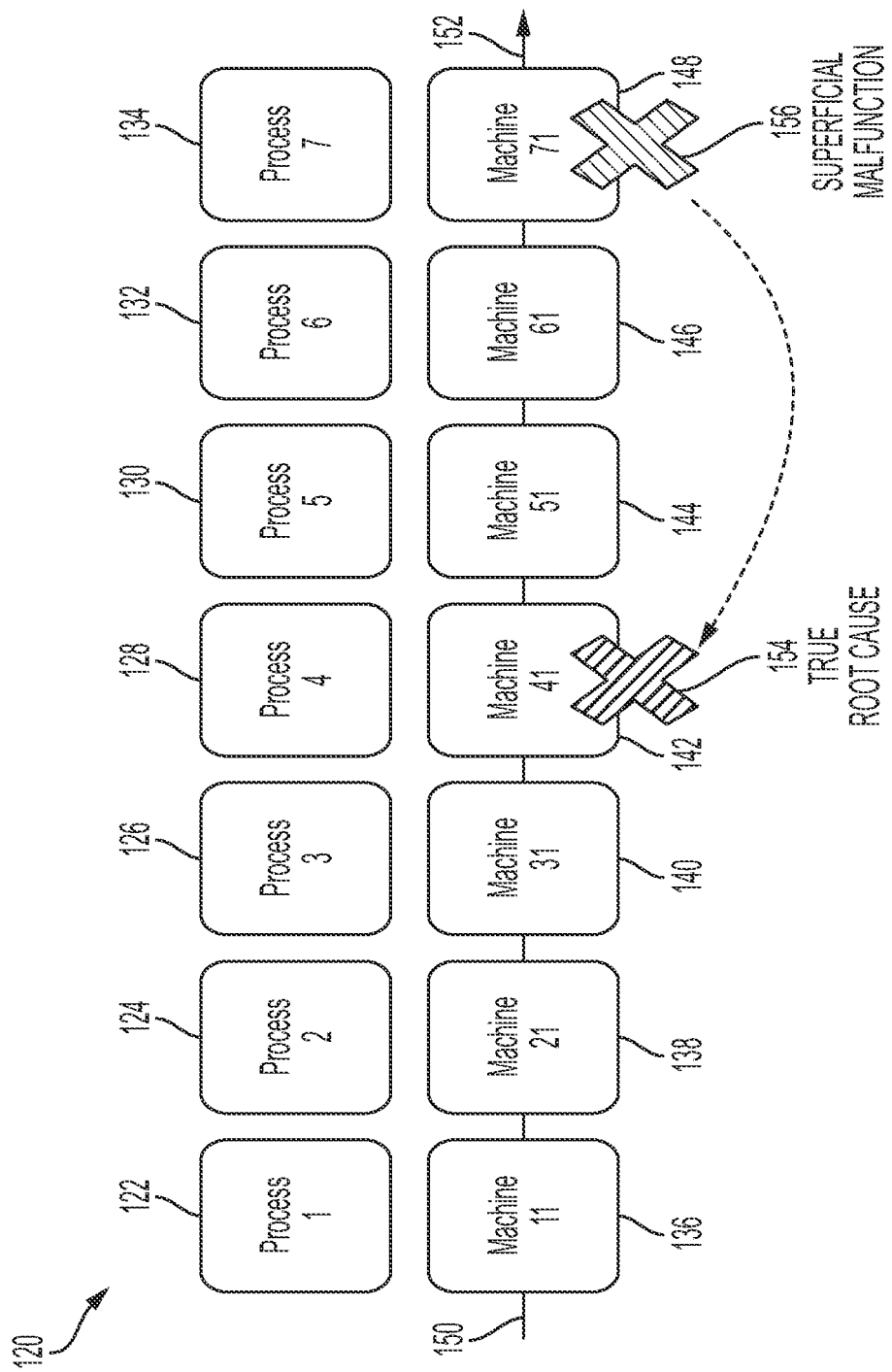
FIG. 1B illustrates a diagram of a superficial malfunction and a true root cause in an environment with multiple processes and machines, in accordance with an embodiment of the present application.

FIG. 1B illustrates a diagram of a superficial malfunction and a true root cause in an environment with multiple processes and machines, in accordance with an embodiment of the present application. Diagram 120 can depict a simplified production line which includes multiple processes, with one machine in each process, e.g.: a process 1 122 with an associated machine 11 136; a process 2 124 with an associated machine 21 138; a process 3 126 with an associated machine 31 140; a process 4 128 with an associated machine 142; a process 5 130 with an associated machine 51 144; a process 6 132 with an associated machine 61 146; and a process 7 134 with an associated machine 71 148. A material (or a lot which includes similarly categorized materials) can flow through the production line indicated in diagram 120, through processes 1 122 to 7 134 via, respectively, machines 11 136 to 71 148, e.g., as indicated by a communication at a start 150 and an end 152.

The system may determine or detect a superficial malfunction 156 at individual machine 71 148. However, the detected malfunction may not necessarily indicate that individual machine 71 148 has issues. Instead, the detected malfunction may indicate that a prior machine in the production line has issues which eventually lead to the detected malfunction, e.g., that a true root cause 154 associated with prior machine 41 142 is responsible for the detected superficial malfunction 156 associated with machine 71 148.

The system can transform raw time series log data into a succinct data sequence organized by a unique product batch number (e.g., a lot number), across multiple processes and associated machines. The transformed data sequence can be referred to as "machine and stop-code sequence data." This can result in reducing the redundancy in a typical log dataset while maintaining the temporal sequence of the filtered data. An exemplary data transformation is described below in relation to FIG. 2.

Figure 2:
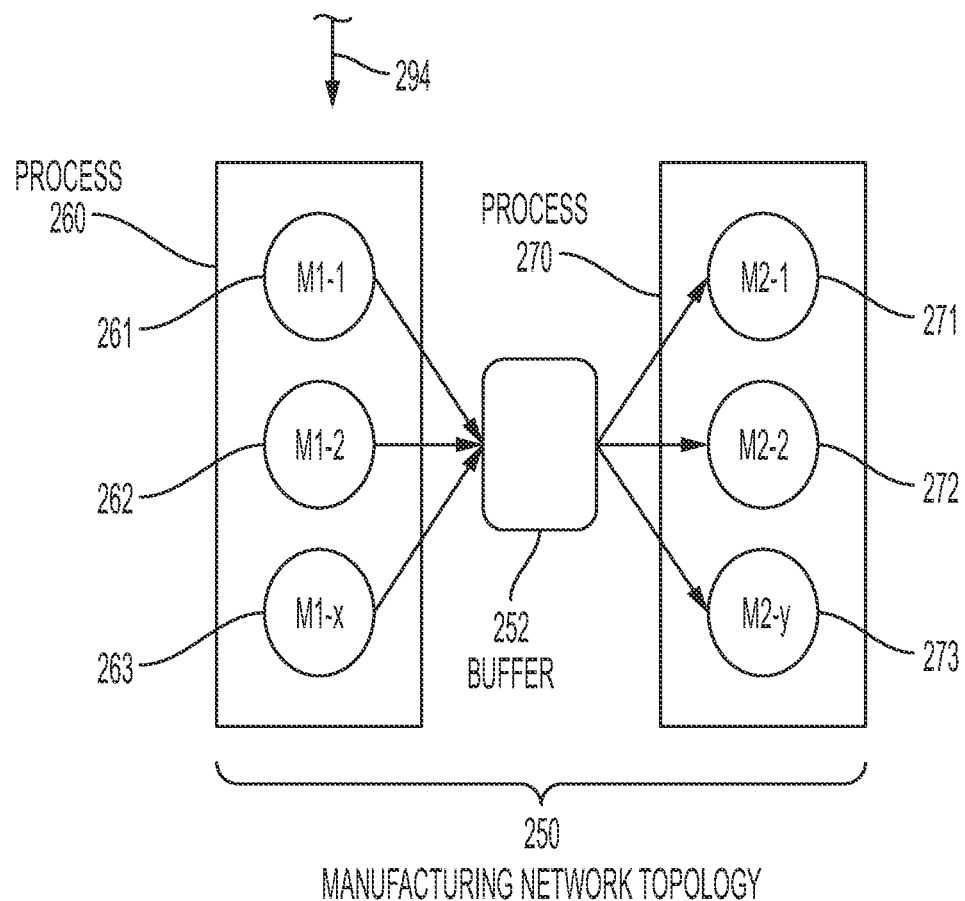
FIG. 2 illustrates an exemplary environment for determining a manufacturing network topology, in accordance with an embodiment of the present application.

FIG. 2 illustrates an exemplary environment for determining a manufacturing network topology, in accordance with an embodiment of the present application. Environment 200 can include data or information associated with or related to a manufacturing system which includes machines and associated processes (e.g., production lines), including: log data 210; machine and stop-code sequence data 220; and a manufacturing network topology 250.

As shown in FIG. 2, log data 210 can include raw data as time series log tables, i.e., the manufacturing system may be associated with a large number of time series data across different machines. For example, a table can include entries with one or more of the following columns: a machine 211; a process 212; a date and/or time (timestamp information) 213; a lot number (product-batch information) 214; an operation flag 215; a stop-code (machine status information) 216; and a number of products (physical objects or materials in a manufacturing system) 217.

The described embodiments can use product-batch information, such as the lot number, to identify relevant information for generating the manufacturing network topology. The same lot numbers may be found in or as a part of the flow of materials through different machines/processes. The system can use these same or common lot numbers to "connect" machines together, i.e., to build the physical links between machines and the logical links between processes.

During operation, the system can store log data 210 and transform log data 210 into machine and stop-code sequence data 220 (via an operation 290). As shown in FIG. 2, machine and stop-code sequence data 220 can include information split into two groups. A first group 230 can include, by lot number, all processes and machines through which the materials of a given lot number flow as part of a given process. A second group 240 can include stop-codes experienced by the materials of the given lot number.

Group 230 can include entries by a given lot number, with columns corresponding to a given process, where the values of entries for each column correspond to a machine number associated with the given process. List 230 can include entries with columns indicating: a lot number 232; a first process PR1 234; a second process PR2 236; and a third process PR3 238. For example, an entry 222 can correspond to a lot number 7446 and can further indicate a flow of materials for lot number 7446 through the following machines/processes: a machine 9 in process PR1; a machine 37 in process PR2; and a machine 82 in process PR3. Similarly, an entry 224 can correspond to a lot number 7474 and can further indicate a flow of materials for lot number 7474 through the following machines/processes: a machine 16 in process PR1; a machine 56 in process PR2; and a machine 93 in process PR3.

The system can build a trie data structure to represent the connections between the various machines in a way which can be easily visualized, as described below in relation to FIG. 3. Based on the information in group 230, the system can generate or determine manufacturing network topology 250 (via an operation 294). Manufacturing network topology 250 can correspond to the manufacturing system and can indicate flows of materials between the machines as part of the processes. For example, manufacturing network topology 250 can indicate processes 260 and 270, where each process has multiple associated machines. Process 260 can include machines M1-1 261, M1-2 262, and M1-$x$ 263, while process 270 can include machines M2-1 271, M2-2 272, and M2-$y$ 273.

As described above, the manufacturing network topology can include physical buffers (such as a physical bin) in which materials may be placed for a certain period of time after being processed by one machine and prior to being processed by the next machine. For example, materials can flow from being processed by machine M1-1 261 of process 260, to a buffer 252 for a period of time, and to being processed by machine M2-2 272 of process 270. Note that because manufacturing network topology 250 depicts buffer 252, it may not be clear to which machine a flow of materials is to continue in process 270 (described in U.S. patent application Ser. No. 17/061,248), In general, the majority of log data is based on normal operations of a manufacturing system. The system may use a default stop-code (such as "0," not shown) for normal operations. Group 240 in machine and stop-code sequence data 220 depicts samples with non-zero stop-code entries. Some lots may also only experience a single stop-code, which can indicate that this stop-code or stop event does not trigger any other stop-codes (e.g., the stop-code of "1" as for lot 7474). Furthermore, the log data may not be generated based on real-time data. Instead, the log data may be based on a period of time, such as over several days, a week, or a month. A visualization of an exemplary manufacturing network topology (machine dependency graph) is described below in relation to FIG. 3.

Figure 3:
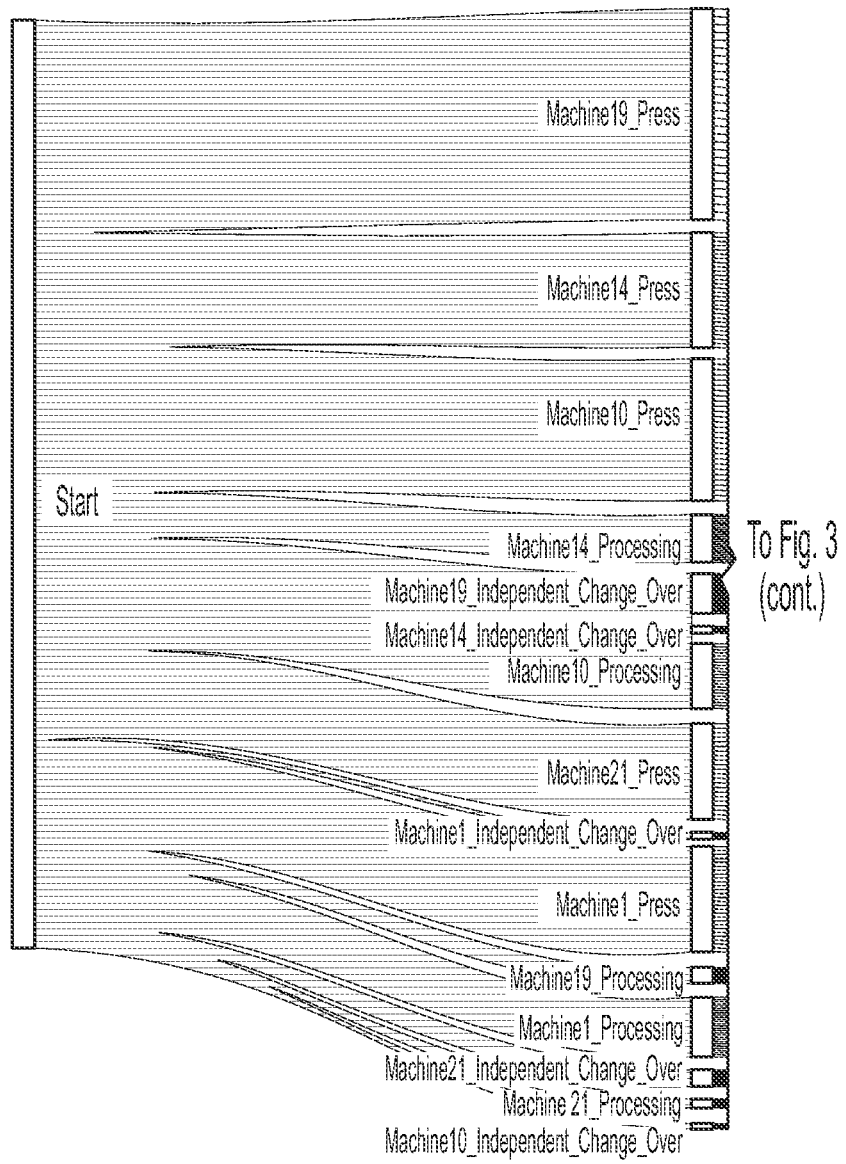
FIG. 3 shows an exemplary derived directed acyclic graph (DAG) for a factory with three processes and 95 machines, in accordance with one embodiment of the present application.
Figure 3:
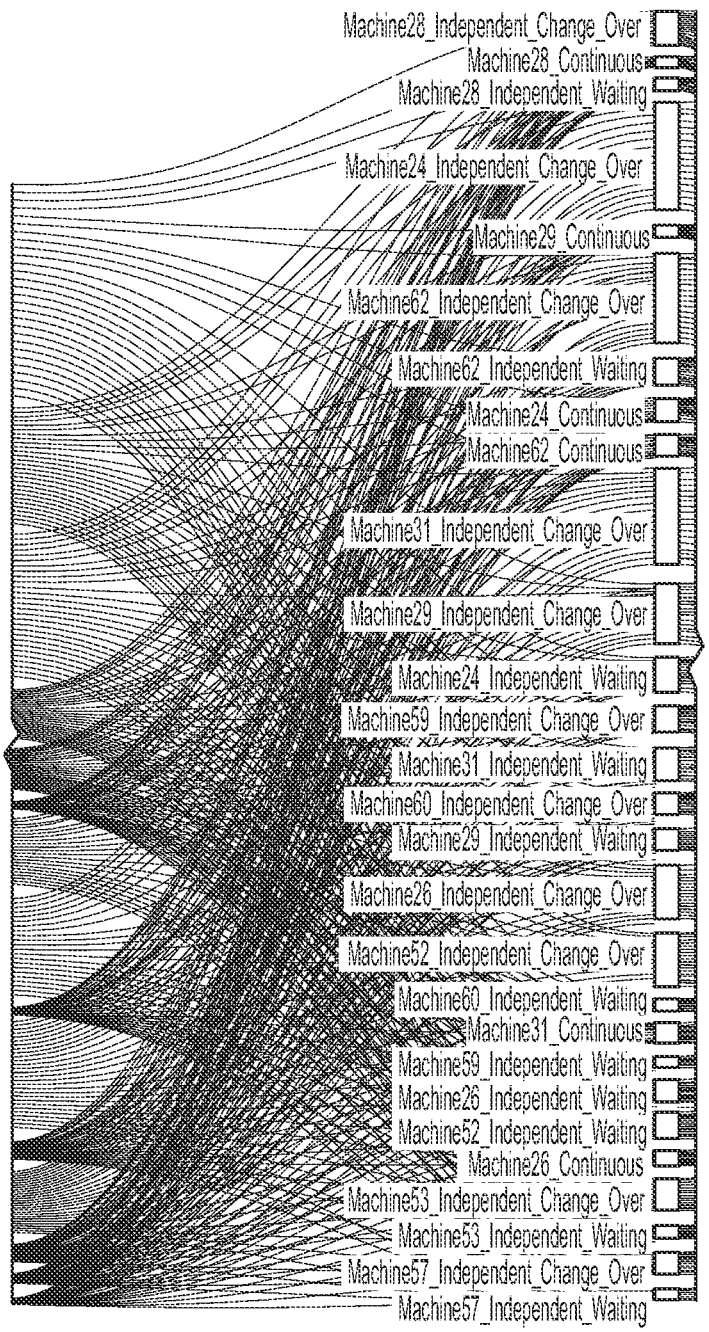
Figure 3:
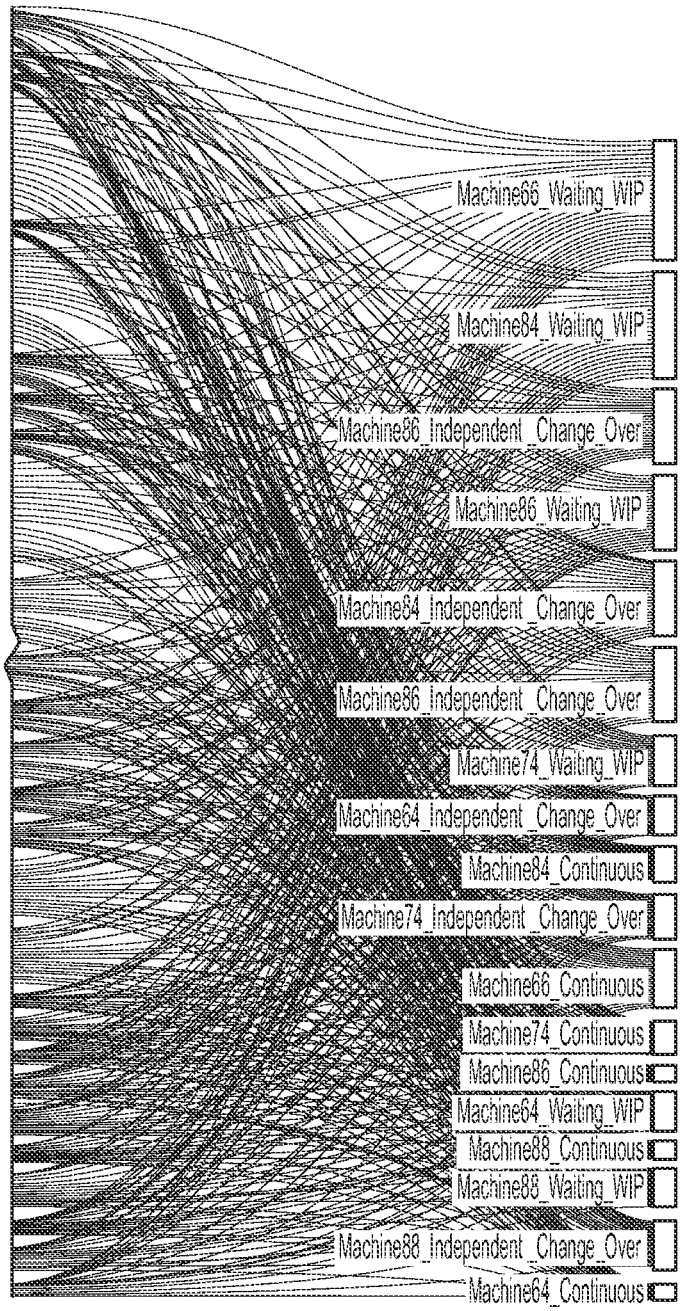

FIG. 3 shows an exemplary derived DAG for a factory with three processes and 95 machines, in accordance with one embodiment of the present application. Graph 300 illustrates the flows of materials through a manufacturing system, starting with parts (e.g., components or materials associated with a same lot number or with the same product-batch information) on the far left, and moving through each respective machine, where each machine is indicated as a node of a certain height as indicated. The height of the node for each indicated machine can correspond to the number of parts which pass through or are processed by a given machine. The taller the node, the greater the number of parts which pass through or are processed by a given machine. The height of the node or the number of same parts processed by a machine can be referred to as the "utilization rate" of the given machine. Furthermore, the taller the indicated flow of materials out of a node, the greater the number of parts which pass through or are processed by a given machine. Parts with a same lot number or product-batch information can pass through or be processed by different machines as part of a same or a different process.

Thus, graph 300 provides a clear visualization of the manufacturing network topology of the manufacturing system, including the flow of materials through the system, the interconnectedness of the various machines, the lots with the greater number of parts, and the machines with the highest utilization rate. Further, graph 300 provides a visualization of a complete manufacturing process with a large number of interconnections between machines.

Given such a manufacturing process (as shown in FIG. 3), with a plurality of devices or machines deployed with sensors, extracting information from all the sensors may be a challenging task. Specifically, when a root cause analysis system is required to provide a useful feedback about one or more fault events or malfunction in a manufacturing process, the system may have to take into consideration a complex set of parameters (or features). For example, the system in addition to evaluating a performance of a specific machine may have to consider that the machine may include missing data or noisy data. Further, the system may also have to consider information received at the machine under consideration from other sensors. Moreover, depending on the frequency with which the sensor data are being recorded, the amount of data that has to be analyzed can grow exponentially which can have a significant impact on the system performance and computational complexity. Performing root cause analysis (RCA) on such a manufacturing process with a large number of interconnections between machines can be computationally intractable.

RCA in a factory can be defined as calculating the likelihoods for the posterior probability of an event in a machine being triggered as a result of another event in a separate machine. The events of interest can be different stop-codes in each machine of the factory. The stops are logged by each individual machine in an automatic fashion. Analyzing and attending to the stops with care is critical to both plant safety and efficiency, but the system may have to take into account that there are large number of stop-codes generated and as a result these can often cause misleading alarms.

Most of the existing approaches focus on providing a reasoning of the stop-codes for the individual machines, that are assumed to be generated as a result of a precursor event in the same machine. These approaches neglect two major factors, i.e., (1) the data at the level required for such analysis is often not available; and (2) the downstream effect of stops on other machines is often ignored in the analysis. The second factor requires a probabilistic analysis of the factory outline. Specifically, in a typical production line of a big factory, the dependency graph representing the edges between individual machines is often "too connected" (a real example is provided in FIG. 3), which can result in RCA that is computationally intractable. Even the approximate methods, e.g., variational Bayes, etc. will likely not work since, in practice, the number of stop-codes and data quality constitutes collecting years and years of data from a single factory for a calculation of probabilities for every stop-code.

To overcome the above-mentioned drawbacks, some of the embodiments described in the present disclosure can perform a targeted pruning of a graph (shown in FIG. 3), i.e., the graph can be partitioned into very sparse and manageable subset. Specifically, the system may perform an analysis of the most frequently used pathways and their relative downtime to detect candidate clusters of interest. Further, due to the nature of some types of factories (that include a large number of interconnected machines), it is often the case that many of the machines are identical and are being used as alternative pathways in the process. It is, therefore, important to detect clusters of pathways that are responsible for processing unique parts. A causal inference system that overcomes the above-mentioned drawback is described below in relation to FIGS. 4-10.

System and Method for Performing Causal Inference

Figure 4:
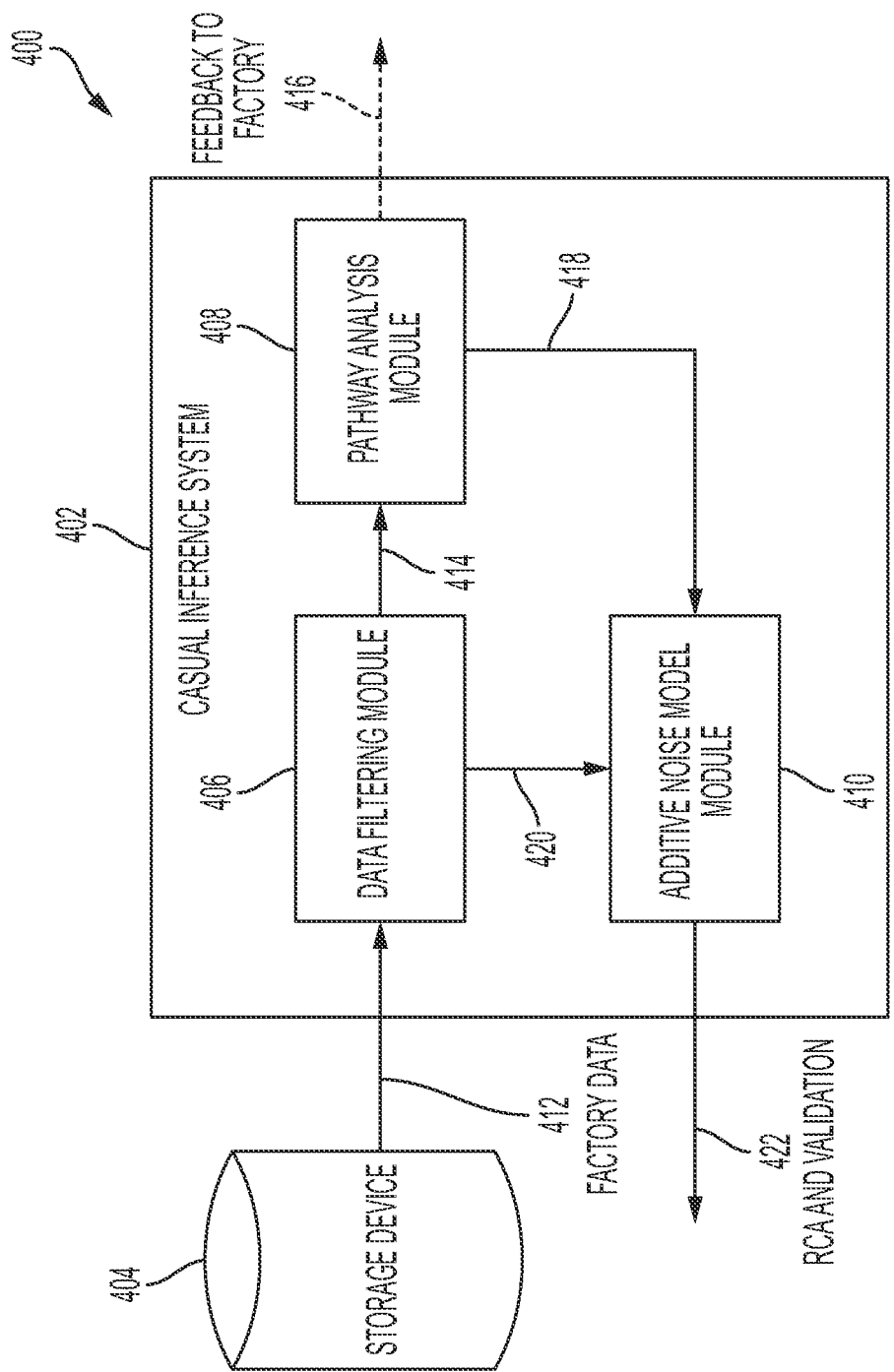
FIG. 4 illustrates an exemplary system architecture for determining a causal inference in a manufacturing process using additive noise models, in accordance with one embodiment of the present application.

FIG. 4 illustrates an exemplary system architecture for determining a causal inference in a manufacturing process using additive noise models, in accordance with one embodiment of the present application. In the example shown in FIG. 4, system architecture 400 can include a storage device, e.g., a database, and a causal inference system 402. Causal inference system 402 (hereinafter "system 402") may receive factory data 412 from storage device 404. System 402 may apply a data filtering module 406 to filter out irrelevant factory data. Module 406 may be associated with both filtering to clean the measurement noise and may also include information provided by a user or a factory worker. Depending on these criteria filtering module 406 may exclude factory data that can result in filtering of approximately 0.1-1% of factory data.

System 402 may apply a pathway analysis module 408 to perform pathway analysis on the filtered data. Specifically, based on the filtered factory data and the time series of part processing, pathway analysis module 408 may build a DAG that is representative of the machine level connectivity in the factory (shown in FIG. 3). Pathway analysis module 408 may pair machines with same lot numbers among different processes. Further, pathway analysis module 408 can perform an analysis of the most frequently used pathways (representing a popularity feature) and their relative downtime (representing a downtime feature) to detect candidate clusters 418 of interest. Specifically, pathways analysis module 408 may generate 3-dimensional scatter plots based on a downtime feature, e.g., downtime ratio of popular pathways with less than four weeks of entries may be considered, a popularity feature, e.g., number of times a respective pathway including a group of machines is applied in the processing system, and other relevant features. Pathway analysis module 408 may also present these plots as a feedback 416 to a factory. Other relevant features can include a number of times maintenance event is performed on machines in a respective pathway; a presence of redundant pathways in the candidate clusters; and temporal information, etc.

System 402 may then apply an additive noise model to the candidate clusters 418 output from pathway analysis module 408. Specifically, additive noise model module 410 may apply a pairwise ANM to analyze potential pathway candidates in candidate clusters 418 that can have highest likelihood of causal relationships with a specific type of machine stop-code. Module 410 may provide results 422, i.e., RCA and validation, for visualization on a GUI via a display device. Therefore, system 402 can facilitate a computationally efficient approach to determine production bottlenecks in a factory and can determine how these bottlenecks can be influential in specific fault modes. System 402 can be implemented as any combination of operations of one or more modules of an apparatus, computing device, a server, computing system, or other entity. In the following, a detailed operation of system 402 is described in relation to FIGS. 5-10.

Figure 5A:
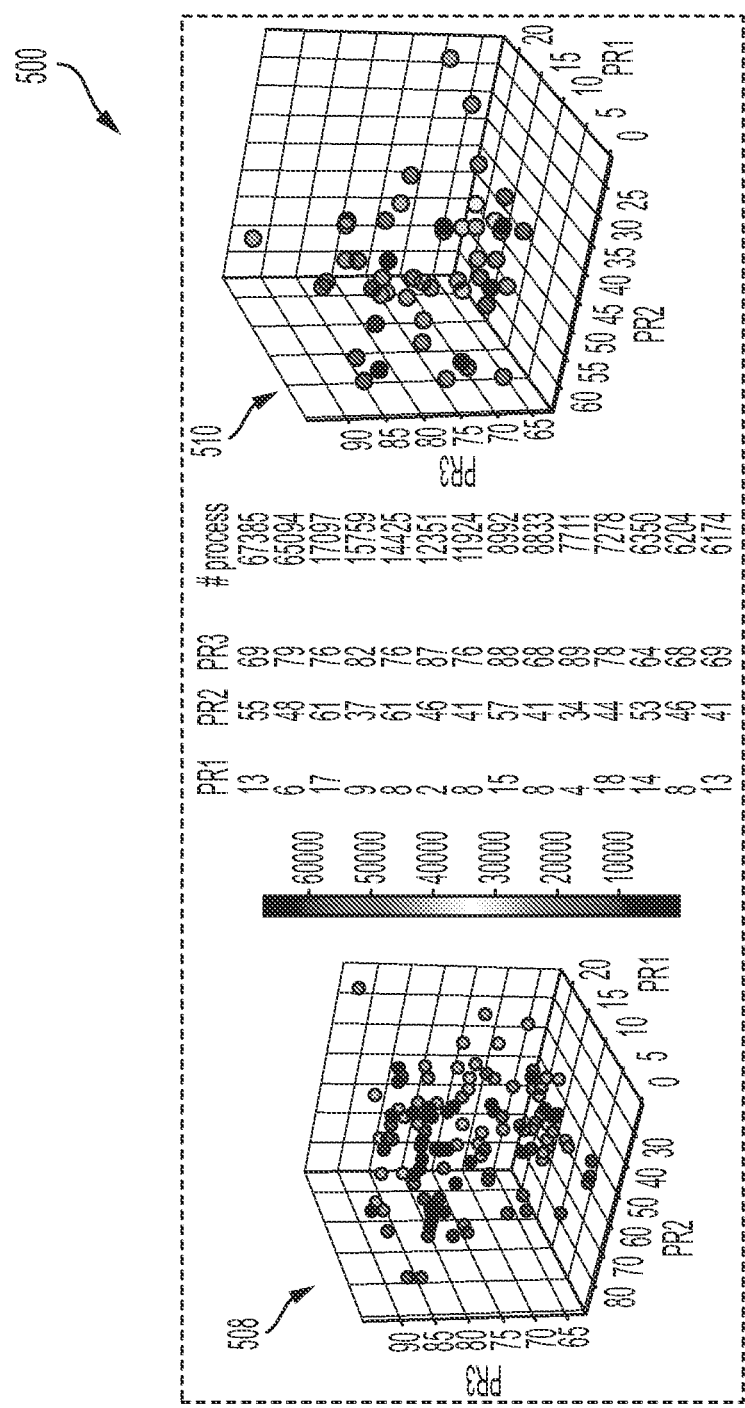
FIGS. 5A-5C illustrate an exemplary generation of a candidate cluster for a factory, in accordance with one embodiment of the present application.
Figure 5B:
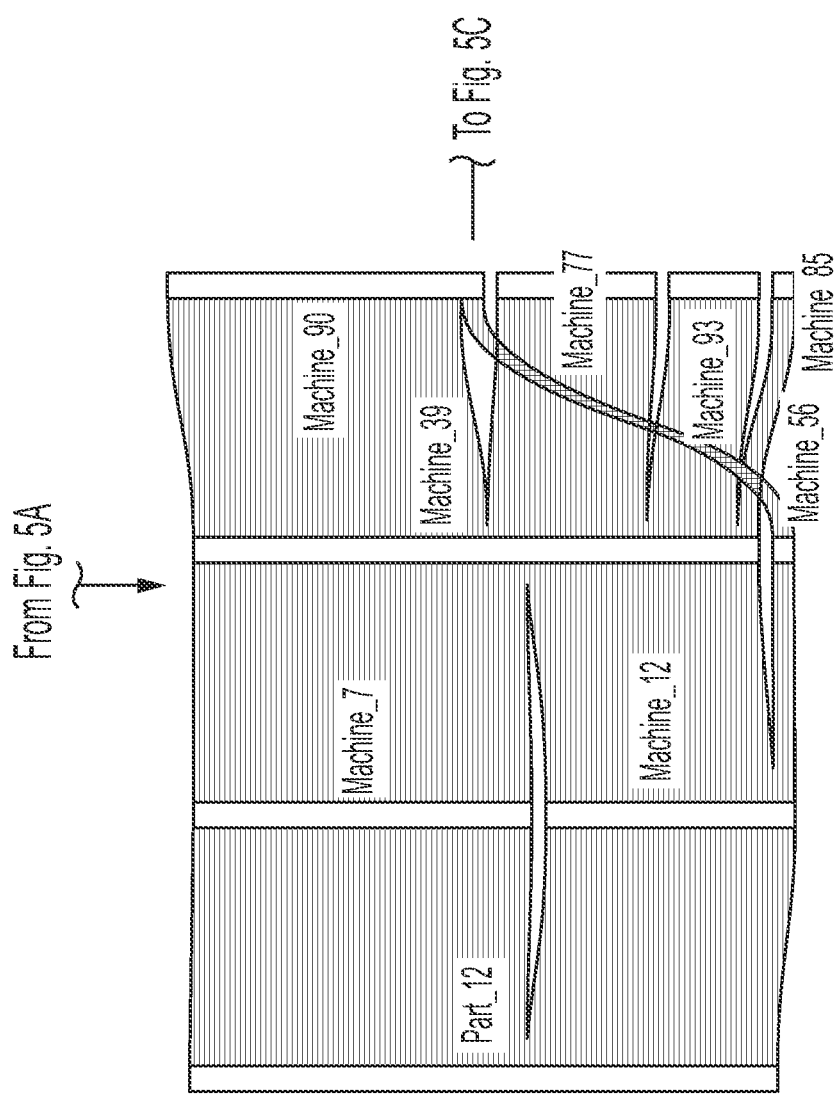
Figure 5C:
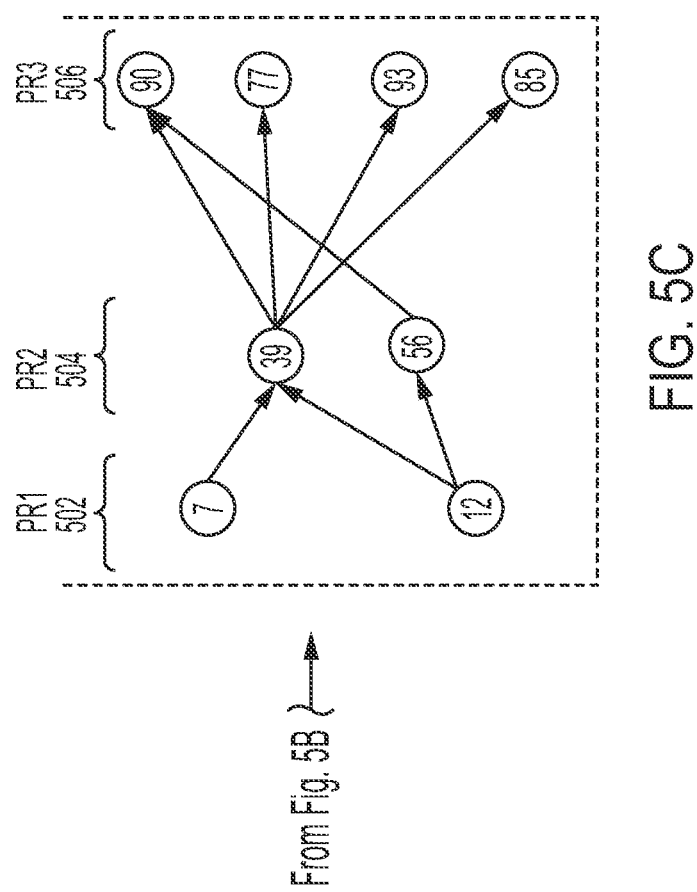

FIGS. 5A-5C illustrate an exemplary generation of a candidate cluster for a factory, in accordance with one embodiment of the present application. In the example shown in FIG. 5A, the system may generate 3-dimensional scatter plots 508 and 510 based on a downtime feature and a popularity feature, respectively. Example plots 508 and 510 can correspond to data from a factory with 95 machines and three separate processes, i.e., process 1 (denoted as PR1), process 2 (denoted as PR2), and process 3 (denoted as PR3).

In the example shown in FIG. 5B, the system can identify, based on a set of features e.g., downtime feature, popularity feature etc., (shown in FIG. 5A), a candidate partition in a graph representing a complete manufacturing process to focus on specific pathways that are responsible for processing unique parts. Specifically, the system may perform an analysis of the most frequently used pathways (representing a popularity feature) and their relative downtime (representing a downtime feature) to detect candidate clusters (or partition) of interest, thereby reducing the network topology or DAG of a complete manufacturing process to a manageable subset.

FIG. 5C represents a DAG for the candidate cluster shown in FIG. 5B. A process PR1 502 can include actions or processes performed on or by machines "7" and "12"; a process PR2 504 can include actions or processes performed on or by machines "39" and "56"; and a process PR3 506 can include actions or processes performed on or by machines "90", "77", "93", and "85."

In other words, the system can perform targeted pruning of graph (shown in FIG. 3), i.e., representing a complete manufacturing process, by partitioning the graph down to a very sparse and manageable subset. Therefore, by pruning the graph connectivity and identifying major pathways, the system can ensure computational tractability of causal inference in an otherwise intractable problem.

In one embodiment, a causal inference system integrating an ANM can deal with non-linearity and noise better than most causal models, e.g., Granger causality, that are highly sensitive to noise. In contrast, ANM derives directional pairwise relationship between machine processes and addresses noise in data by residual analysis (post regression).

Figure 6:
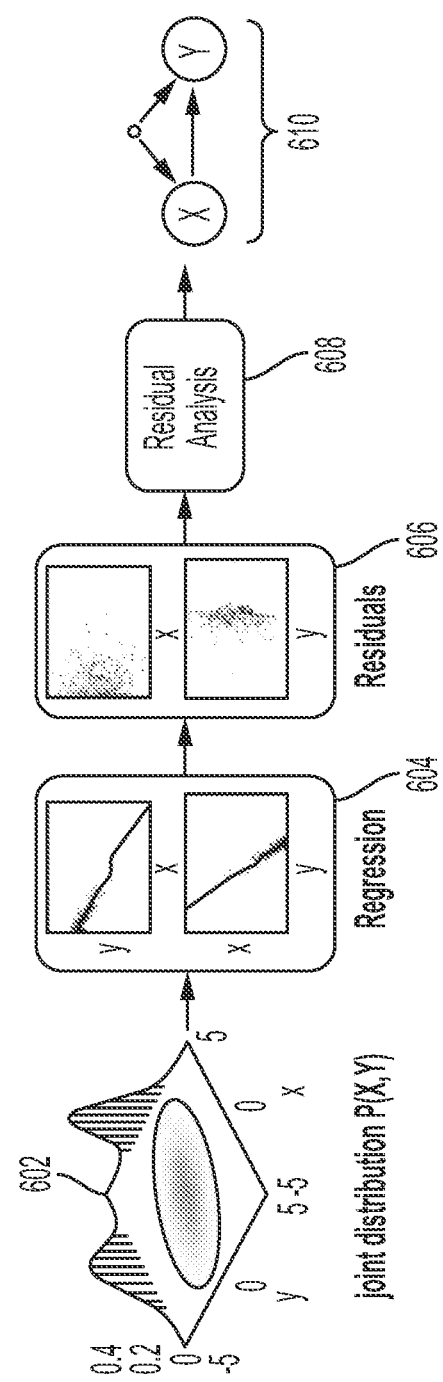
FIG. 6 illustrates an exemplary framework for analyzing causality based on an additive noise model, in accordance with one embodiment of the present application.

FIG. 6 illustrates an exemplary framework for analyzing causality based on an additive noise model, in accordance with one embodiment of the present application. Given a specific malfunction or a failure in a manufacturing process, it may be desirable to determine a root cause of the malfunction or failure. For example, a performance of a machine may degrade due to some other operation associated with that machine or can be caused by some event either downstream or upstream in a manufacturing production line. Determining correlation among different variables associated with the machines in the manufacturing process may not be sufficient to identify a root cause of the failure as correlation does not inherently addresses cause and effect. Determining a direction in which the failure is flowing may be more important and consequential, to that end a specific root cause analysis approach may be required to address noise, missing data, non-linearity, delay between different machines, etc.

The example shown in FIG. 6 demonstrates how the system applies a pairwise additive noise model to determine the likelihood of causal relationships between two variables in a candidate partition of FIG. 5. Analyzing every pair of possibilities in the candidate partition may be computationally inefficient. In one embodiment, the causal inference system may apply a pairwise ANM based on a finite subset of variables, e.g., downtime and popularity features, thereby improving the computational efficiency and performance of the system. Specifically, the system may analyze the cause-and-effect pairs in the candidate cluster along different candidate pathways using an ANM.

An ANM can be defined for a pair of random variables, but easily be extended to more than one pair. In the case of one pair, an ANM can be used for causal inference between a random variable X and a random variable Y. Specifically, for independently and identically distributed (iid) factory data from (X, Y), a regression model 604

$$Y=f(X)+N \quad (1)$$

can lead to residuals $\hat{N}$ 606 and the reverse regression model 604

$$X=g(Y)+\tilde{N} \quad (2)$$

can lead to residuals $\widetilde{N}$ 606. In equation (1), X can represent a cause and Y the effect, where N denotes additive noise that is independent of the cause X, and $f$ can represent a linear or a non-linear function. In equation (2), Y can represent a cause and X the effect where $\tilde{N}$ denotes additive noise that is independent of the cause Y, and g can represent a linear or a non-linear function.

If causality exists, for example X→Y, a joint distribution P (X, Y) allows an ANM (in equation (1)) in one direction, the reverse ANM (defined in equation (2)) may not be allowed.

Specifically, the system may determine a set of inferences 610 based on a set of conditions defined in Table 1 below (symbol ⊥ denotes orthogonality).

TABLE 1

Residual analysis

| Condition | Inference |
|---|---|
| if $\hat{N} \perp X$ and $\widetilde{N}$ not $\perp Y$ | "X is causing Y" |
| if $\hat{N}$ not $\perp X$ and $\widetilde{N} \perp Y$ | "Y is causing X" |
| if $\hat{N}$ not $\perp X$ and $\widetilde{N}$ not $\perp Y$ | "I do not know (bad model fit)" |
| if $\hat{N} \perp X$ and $\widetilde{N} \perp Y$ | "I do not know (both directions possible)" |

In other words, the system may extract pathways from a candidate cluster based on temporal part processing information. Given a selected variable of interest between two machines, e.g., downtime feature or popularity feature, the system may perform regression for each pathway and apply an independence criterion for analyzing the independence of residuals.

In one embodiment, the system can apply Hilbert Schmidt independence criterion (HSIC) which is a non-parametric measure of dependence between two variables (the measure can be referred to as an ANM score). In large sample limit, HSIC is "0" if variables are jointly independent, and HSIC is large and positive if there is a dependence. For a candidate partition and a corresponding DAG (shown in FIG. 5B and FIG. 5C, respectively), the system may perform analysis of different pathways. For example, the system may perform an analysis of an example pathway, i.e., the pathway representing machines 7→39→90 in FIG. 5B. Table 2 below illustrates the different examples of this analysis based on HSIC and the ANM score. An example of an impact of a pruning process based on an ANM score on the causal inference is described below in relation to FIGS. 7A-7C.

TABLE 2

Analysis of an example pathway based on HSIC
Pathway under consideration: 7 → 39 → 90

| Hypothesis 1: Does stop-code in machine 39 (X) cause production halt in machine 90 (Y)? | HSIC ($\hat{N} \perp X$)~0.10<br>HSIC ($\widetilde{N} \perp Y$)~1.48<br>Mild indication of causality |
|---|---|
| Hypothesis 2: Does stop-code in machine 39 (X) cause production halt in machine 77 (Y)? | HSIC ($\hat{N} \perp X$)~0.33<br>HSIC ($\widetilde{N} \perp Y$)~2.53<br>Mild indication of causality |
| Hypothesis 3: Does stop-code in machine 39 (X) cause production halt in machine 93 (Y)? | HSIC ($\hat{N} \perp X$)~1.51<br>HSIC ($\widetilde{N} \perp Y$)~1.33<br>No indication of causality |

Figure 7A:
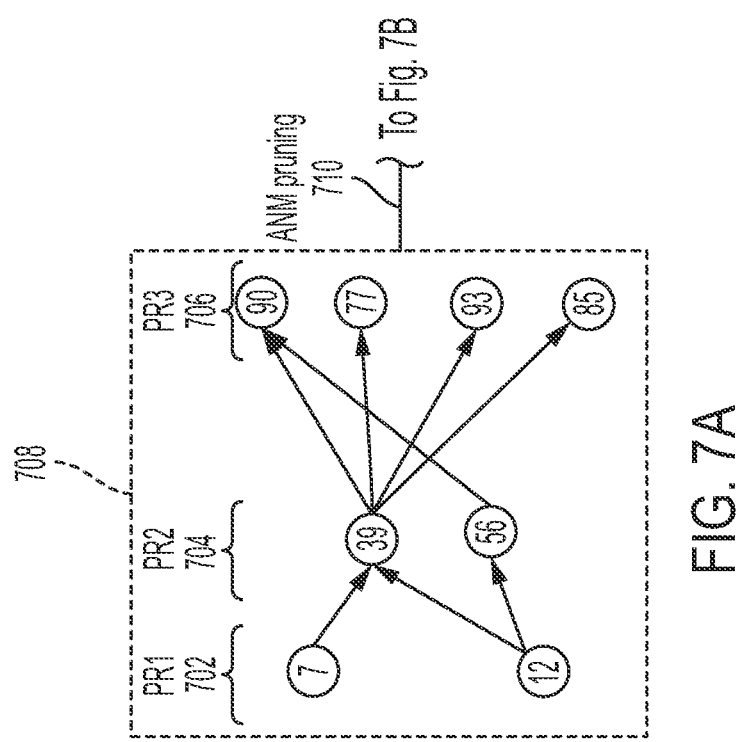
FIG. 7A illustrates an exemplary DAG for a candidate partition representing three separate processes in a factory with 95 machines, in accordance with one embodiment of the present application.

FIG. 7A illustrates an exemplary DAG for a candidate partition representing three separate processes in a factory with 95 machines, in accordance with one embodiment of the present application. The example shown in FIG. 7A, represents a DAG 708 for candidate partition shown in FIG. 5B. Specifically, process PR1 702 can include actions or processes performed on or by machines "7" and "12"; a process PR2 704 can include actions or processes performed on or by machines "39" and "56"; and a process PR3 706 can include actions or processes performed on or by machines "90", "77", "93", and "85."

Figure 7B:
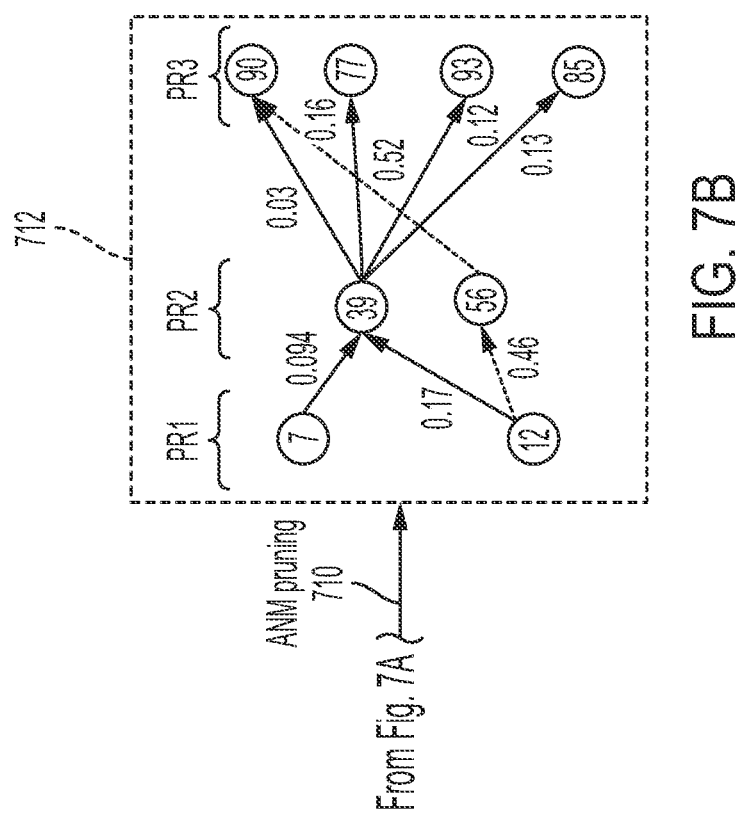
FIG. 7B illustrates an exemplary pruning of DAG shown in FIG. 7A based on additive noise model scores, in accordance with one embodiment of the present application.

FIG. 7B illustrates an exemplary pruning of DAG shown in FIG. 7A based on ANM scores, in accordance with one embodiment of the present application. It is desirable to derive one or more features, e.g., downtime feature, popularity feature, etc., on which the ANM may perform causality analysis. In one embodiment, when implementing an ANM, the causality can be performed by regression analysis which can be significantly affected by lead and/or lag time (e.g., delay between machines while processing one or more parts). For example, manufacturing processes in a manufacturing system may have a certain lead and/or lag time. Since associating every event in the manufacturing process with a corresponding lead and/or lag time may be difficult and computationally inefficient, the causal inference system may take into account the lead and/or lag times in the process by applying reasonable time steps that are in accordance with the time delays, i.e., the lead and/or lag times, in each factory. For example, given a set of features on which the ANM RCA analysis can be performed, the system may match the corresponding features from machines along different pathways such that they align with one another with respect to lag times.

The system may perform pathway analysis on different pathways in a candidate partition (an example of such an analysis is shown above in Table 2). A weight associated with each edge in the DAG can represent an ANM score. Based on the ANM scores the system may perform ANM based pruning 710 of DAG 708 to remove pathways that indicate low or no causality. For example, the ANM scores (or weights) on pathway 12→56→90 in DAG 712 indicate that this pathway includes no causal relationships, therefore the system may remove this pathway (indicated by dotted lines) from DAG 712.

Figure 7C:
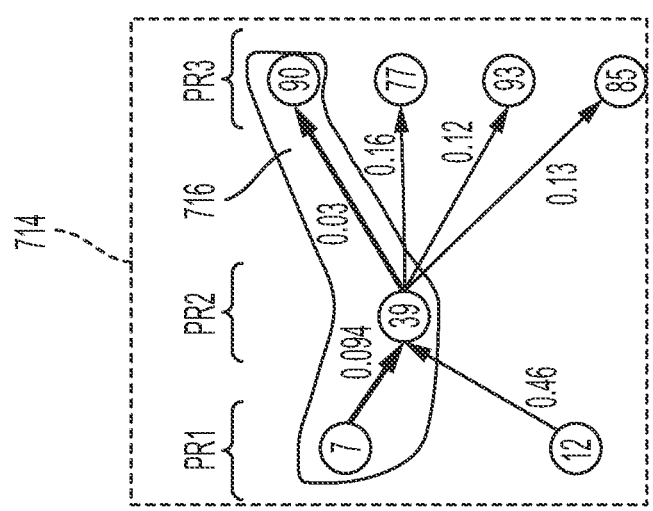
FIG. 7C illustrates an exemplary pathway in the DAG shown in FIG. 7B that causes stop-code maintenance, in accordance with one embodiment of the present application.

FIG. 7C illustrates an exemplary pathway in the DAG shown in FIG. 7B that causes stop-code maintenance, in accordance with one embodiment of the present application. In response to pruning DAG 712, system may further perform ANM based RCA on a pruned DAG 714 for finding a pathway that causes stop-code maintenance. Specifically, based on the ANM scores associated with each pathway in DAG 714, the system may identify a pathway that is likely to contain a causal relationship. For example, the ANM scores associated with pathway 716, i.e., pathway 7→39→90, indicates a higher likelihood of causal relationships when compared to ANM scores on other pathways in DAG 714. In other words, the ANM scores in highlighted pathway 716 may indicate a stronger causality between machines in the pathway 716 with regards to producing certain stop-codes based on an operation flag.

The results shown in DAG 714 can be leveraged in an analysis of a manufacturing process in a factory. In other words, the system can determine major problematic bottle necks in a factory and can determine pathways that are causing specific stop-codes in machines. Specifically, the results shown in DAG 714 can indicate that machine 39 may be causing a failure in the manufacturing system which needs to be addressed. For example, machine 39 may be repaired or an alternate machine may be added to alleviate the failure.

Therefore, applying the ANM based RCA in identifying a data driven structure of a factory may result in a scalable causality analysis. Further, given a mild or strong indication, the system including the ANM may provide several hints as to which pathways are definitive or which pathways are alternative (or redundant), depending on different causality levels.

In addition, the system can facilitate a computationally tractable ANM based RCA in the manufacturing system which can improve the efficiency and the performance of the system. In other words, the system can initially reduce a large amount of electronic data into a manageable subset, i.e., by partitioning a DAG representing the manufacturing system to a sparse and manageable subset. The system can then prune the candidate partition to identify one or more pathways that cause a specific stop-code. Therefore, the system can reduce the size of the DAG to facilitate a computationally tractable ANM based RCA, which results in an improved efficiency and performance of the system.

Furthermore, the system can facilitate an efficient pruning of possible edges by extending the pairwise analysis. Further, the system including ANM for performing RCA can be extended to categorical data, e.g., data representing the state of a machine, and quantitative sensory data, and addressing more than two variables can be straightforward.

In addition, the results of both constructing the manufacturing network topology, i.e., the DAG of a complete manufacturing process as shown in FIG. 3, a partitioned DAG, and a pruned DAG generated using ANM based RCA (shown in FIG. 7C) can be visually displayed and manipulated in a way which is friendly to human interpretation.

Figure 8:
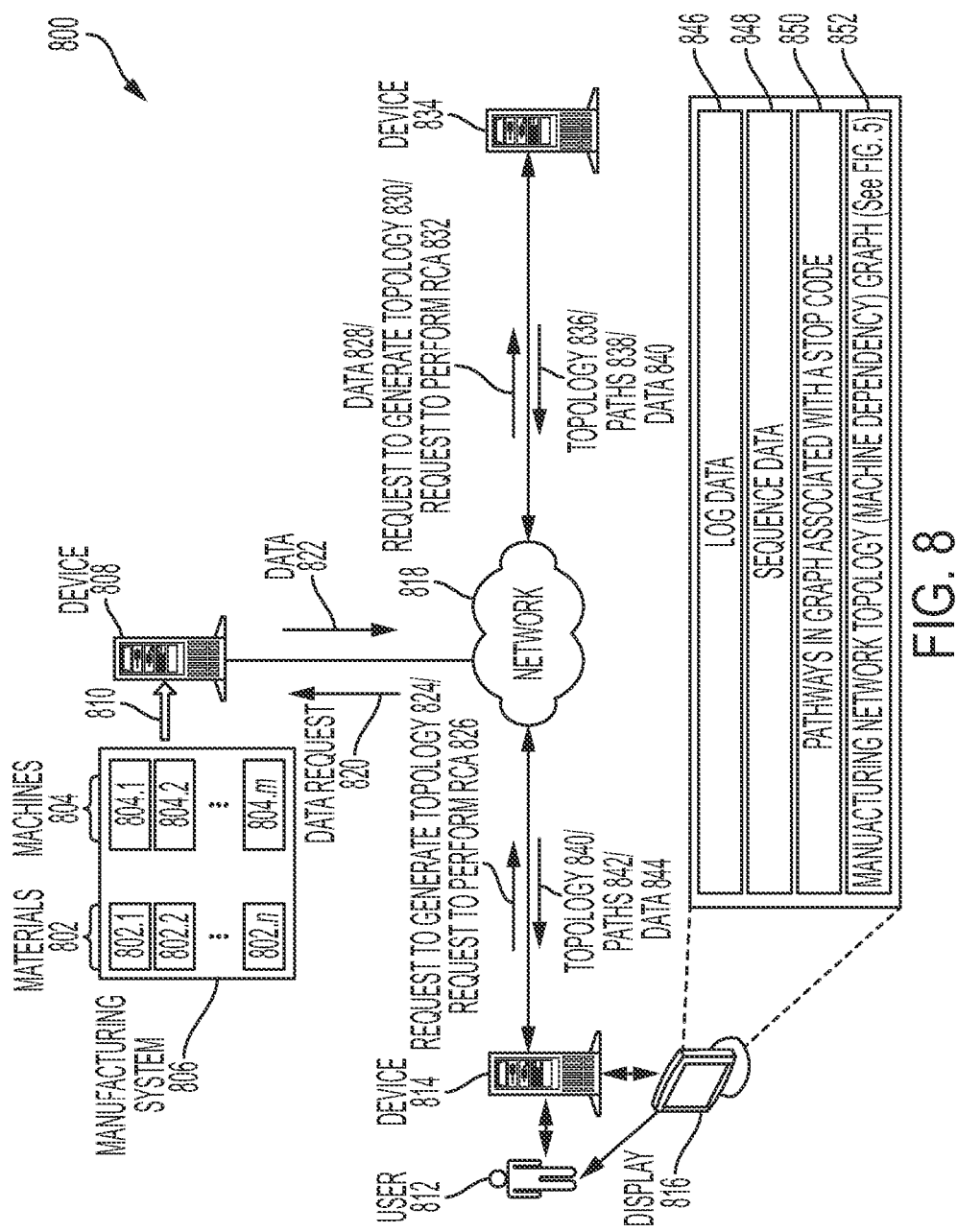
FIG. 8 shows an exemplary environment for determining a causal inference in a manufacturing process using additive noise models, in accordance with one embodiment of the present application.

FIG. 8 shows an exemplary environment for determining a causal inference in a manufacturing process using additive noise models, in accordance with one embodiment of the present application. Environment 800 can include: a device 814, an associated user 812, and an associated display 816; a manufacturing system 806; a device 808; and a device 834. Devices 808, 814, and 834 can communicate with each other via a network 818. Manufacturing system 806 can represent a manufacturing facility or a manufacturing network, and can include materials 802 (e.g., 802.1-802.$n$) and machines 804 (e.g., 804.1-804.$m$). Materials 802 can undergo various processing by machines 804, e.g., as part of specific processes. This processing can generate log data, which can be stored by device 808 (via a communication 810). Devices 808, 814, and 834 can be a server, a computing device, or any device which can perform the functions described herein.

During operation, user 812 can send a request, via display 816 and device 814, for a manufacturing network topology associated with manufacturing system 806. Device 814 can send a generate topology command 824 to device 834. Device 834 can receive generate topology command 824 (as a generate topology command 830). At a subsequent, prior, or similar time, device 808 can send to device 834 (based on a request which triggers a get log data 820 request) log data 822. Device 834 can receive log data 822 (as log data 828) and can transform the received log data to sequence data. Device 834 can return the log data and/or the transformed sequence data as data 840 to device 814. Upon receiving data 840 (as data 844), device 814 can display on display 816 log data 846 and sequence data 848. User 812 can use interactive GUI elements to manipulate log data 846 and sequence data 848 (not shown).

In response to receiving generate topology command 830, device 834 can also generate the manufacturing network topology, and can return a topology 836 to device 814. Upon receiving topology 836 (as topology 840), device 814 can display on display 816 a manufacturing network topology (machine dependency) graph 852 (as described above in relation to FIG. 3).

User 812 can also send a request to perform RCA for one or more stop-codes associated with a one or more events in the manufacturing process, via display 816 and device 814, based on the transformed data 848 and the manufacturing network topology 852. Device 814 can send a request to perform RCA 826 to device 834. Device 834 can receive request to perform RCA 826 (as a command 832). Device 834 can generate, based on an ANM, the major pathways in a graph for a specific stop-code, and can return paths 838 to device 814. Upon receiving paths 838 (as paths 842), device

814 can provide a visual representation of paths 842 on display 816 in graph 850 (as described above in relation to FIGS. 7A-7C).

Display 816 can include interactive GUI elements which can allow user 812 to manipulate any of the displayed data. For example, the GUI may include an option for user 812 to select from the displayed DAG specific pathways of interest, i.e., the user might be interested in analyzing specific pathways. In response to user's selection of the pathways, device 834 may perform RCA analysis based on an ANM and available log data 828. Based on the analysis of the selected pathway, device 834 may send a feedback to device 814 which can be displayed on device 816. In some embodiments, the user can address any diagnosed or indicated causes of one or more stop-codes and can generate commands to re-generate new pathways. The system can display an overlay of the newly generated pathways on the original pathways and can display other GUI elements which allow the user to view detailed information regarding the differences.

Thus, environment 800 depicts how a user can send a request for data and can further send commands to generate the manufacturing network topology and the pathways based on the data. Note that while these three elements are shown as distinct data flows in environment 800, the user can also initiate the request for data and the commands to generate both the manufacturing network topology and the pathways as a single command or user operation, or as any combination of commands or user operations. Device 834 can also perform above-mentioned operations as part of an automatic or other administrative process or in response to a request from another entity or other user. Furthermore, device 834 can comprise an apparatus with units or modules configured to perform the operations described herein. The operations described herein can be implemented as any combination of operations of one or more modules of an apparatus, computing device, a server, computing system, or other entity.

Figure 9:
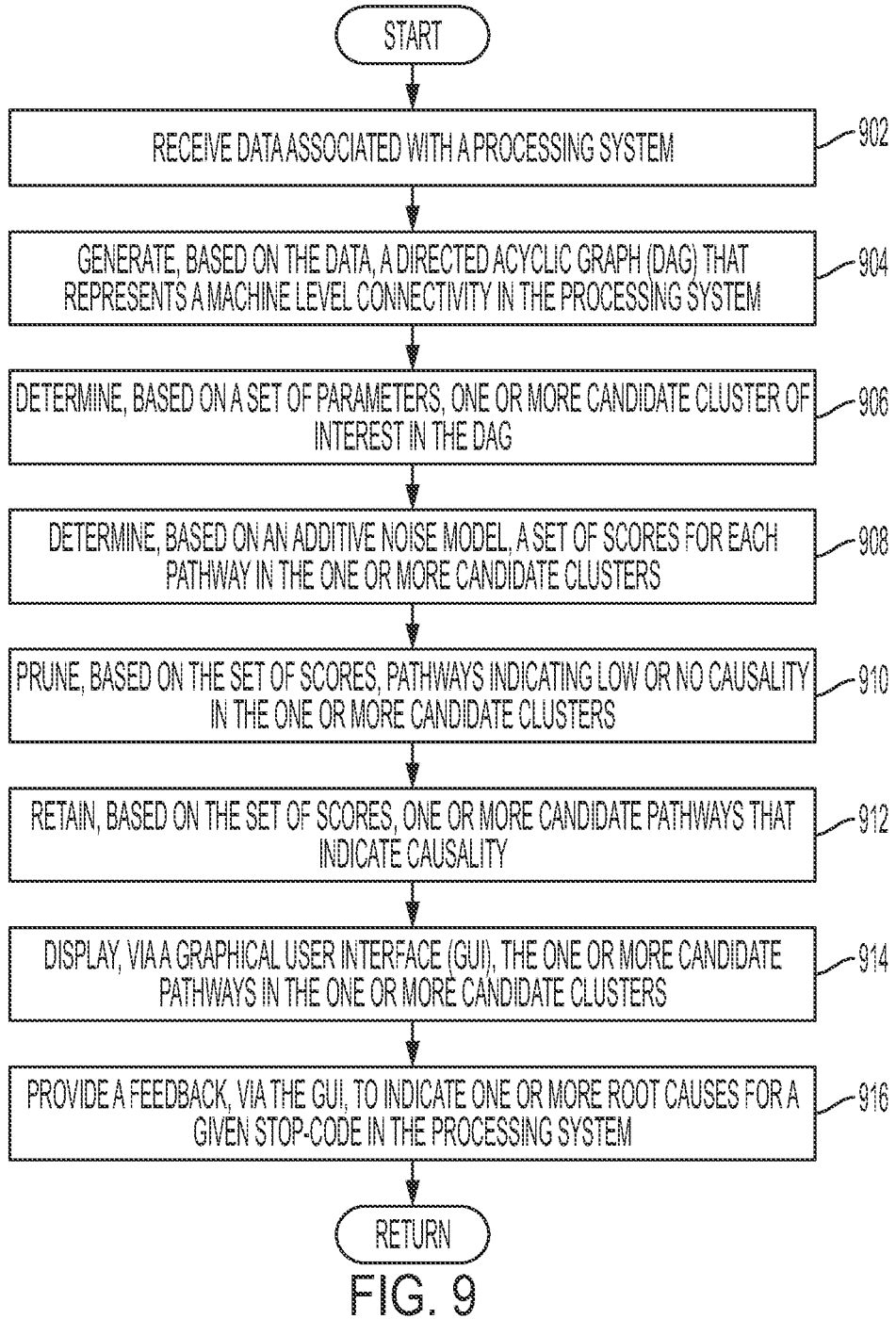
FIG. 9 presents a flowchart illustrating a process for determining a causal inference in a manufacturing process using additive noise models, in accordance with one embodiment of the present application.

FIG. 9 presents a flowchart illustrating a process for determining a causal inference in a manufacturing process using additive noise models, in accordance with one embodiment of the present application. During operation, the system can receive data associated with a processing system (operation 902). The processing system can include a set of interconnected machines and an associated set of processes. Based on the received data the system can generate a DAG that can represent a machine level connectivity in the processing system (operation 904). The system can effectively and efficiently extract, from manufacturing log data, i.e., received data, information associated with the flow of materials through various processes and multiple machines in the processing system or network.

The system can determine, based on a set of parameters, one or more candidate clusters of interest in the DAG (operation 906). Each candidate cluster can be associated with one or more parameters. The set of parameters can include one or more of: a downtime associated with a respective machine; a number of times maintenance event is performed on machines in a respective pathway; a presence of redundant pathways in the candidate clusters; temporal information; number of times a respective pathway including a group of machines is applied in the processing system.

The system can then determine, based on the one or more parameters and the ANM, a set of scores for each pathway in the one or more candidate clusters (operation 908). A respective score can indicate a degree of causality associated with a pair of machines in a process flow. Based on the set of scores, the system can remove (or prune) one or more pathways that indicate low or no causality (operation 910). When pathways indicate low or no causality, the machines along these pathways may not be responsible for causing the given stop-code in the processing system. The system may retain the other pathways associated with a score that can indicate a mild or strong (or high) causality (operation 912). The system may then display, via a GUI, the one or more candidate pathways indicating mild or high level of causality in the one or more candidate clusters (operation 914). The system can then provide a feedback, via the GUI, to indicate one or more root causes for a given stop-code in the processing system (operation 916).

Exemplary Distributed Computer System

Figure 10:
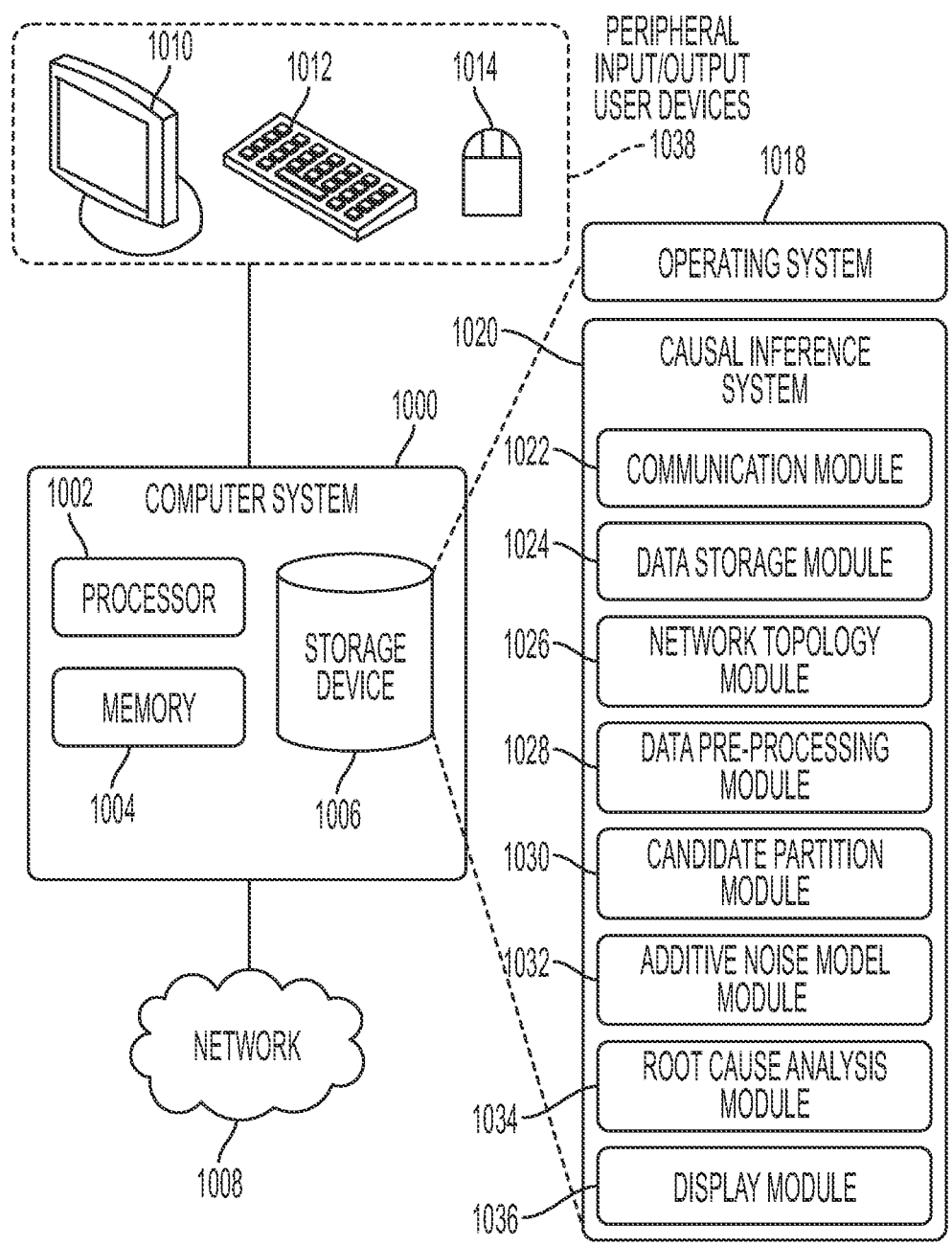
FIG. 10 illustrates an exemplary computer system that facilitates determining a causal inference in a manufacturing process using additive noise models, in accordance with one embodiment of the present disclosure.

FIG. 10 illustrates an exemplary computer system that facilitates determining a causal inference in a manufacturing process using additive noise models, in accordance with one embodiment of the present disclosure. In this example, computer system 1000 can include a processor 1002, a memory 1004, and a storage device 1006. Memory 1004 can include a volatile memory (e.g., RAM) that serves as a managed memory, and can be used to store one or more memory pools. Computer system 1000 can be coupled to peripheral input/output (I/O) user devices 1038, e.g., a display device 1010, a keyboard 1012, and a pointing device 1014, and can also be coupled via one or more network interfaces to network 1008. Storage device 1006 can store instructions for an operating system 1018 and a causal inference system 1020.

In one embodiment, causal inference system 1020 can include instructions, which when executed by processor 1002 can cause computer system 1000 to perform methods and/or processes described in this disclosure. Causal inference system 1020 can include a communication module 1022 for sending and/or receiving/obtaining data packets to/from other network nodes across a computer network. A data packet can include, e.g., a request, a command, data, user input, sequence data, log data, a topology, paths, etc.

Causal inference system 1020 can further include instructions implementing a data storage module 1024 for storing data associated with a manufacturing system which includes machines and associated processes. The data includes timestamp information, machine status information, and product-batch information.

Causal inference system 1020 can include a network topology module 1026 to determine, based on the stored data, a manufacturing network topology, i.e., a DAG indicating a machine level connectivity, which corresponds to a manufacturing system. The manufacturing network topology can include flows of materials between machines as part of the processes.

Causal inference system 1020 can include a data pre-processing module 1028 for deriving one or more features based on the manufacturing log data. Causality analysis of the manufacturing system can be performed based on the derived features. These features can include a downtime, popularity, and other features which may be of interest for performing causality analysis. The other features can include one or more of: a downtime associated with a respective machine; a number of times maintenance event is performed on machines in a respective pathway; a presence of redundant pathways in the candidate clusters; temporal information; number of times a respective pathway including a group of machines is applied in the processing system.

Candidate partition module 1030 can further partition the DAG (determined in network topology module 1026) into a sub-graph based on the derived one or more features. For example, candidate partition module 1030 may match the derived one or more features associated with different machines along a pathway such that they align with one another. In response to partitioning the DAG into a candidate cluster, additive noise model module 1032 may apply an ANM (based on the derived features) to determine a set of scores for the different pathways in the candidate cluster and to prune the candidate cluster based on the set of scores.

Causal inference system 1020 may then apply a root cause analysis module 1034 on the pruned candidate cluster for determining, based on the set of scores, major pathways that indicate causal relationships a certain stop-code. Further, root cause analysis module 1034 can generate a feedback indicating the possible bottlenecks in the manufacturing system and may indicate specific pathways that is likely to include causal relationships for a specific stop-code. A display module 1036 may display, via a user-interactive GUI, on display device 1010 a visual representation of the feedback indicating specific pathways in the DAG associated with a candidate cluster that is likely to include causal relationships for a specific stop-code, thereby facilitating a user-friendly root cause analysis in a manufacturing system. Further, display module 1036 can also enable a user to select one or more pathways displayed in the GUI of display device 1010.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:
   receiving, by a computer, data associated with a processing system which includes a set of interconnected machines and an associated set of processes;
   generating, based on the data, a graph indicating flows of outputs between the machines as part of the processes;
   determining, based on a set of variables, one or more candidate clusters in the graph, wherein a candidate cluster is provided with one or more variables of interest;
   performing, based on the one or more variables of interest, root cause analysis on the one or more candidate clusters by:
   applying, based on the one or more variables of interest, an additive noise model to prune the one or more candidate clusters from the graph; and
   determining, based on the pruned graph, a candidate pathway likely to cause an issue in at least one process, thereby facilitating improved efficiency in the processing system.

2. The computer-implemented method of claim 1, wherein the set of set of variables includes one or more of:
   an issue associated with a respective machine;
   a number of times a respective pathway including a group of machines is applied in the processing system;
   redundant pathways applied;
   a number of times maintenance event is performed on machines in a respective pathway; and
   temporal information.

3. The computer-implemented method of claim 1, wherein the data includes timestamp information, machine status information, product-batch information, parts processed by different machines.

4. The computer-implemented method of claim 3,
   wherein the product-batch information comprises a lot number which corresponds to a plurality of physical objects of the processing system, wherein the physical objects share at least one common characteristic, and
   wherein the machine status information comprises one or more of an identifier of an issue and a fault type.

5. The computer-implemented method of claim 1, further comprising:
   providing a feedback, based on the candidate pathway, to indicate one or more root causes for a given stop-code;
   displaying, via a graphical user interface, a visual representation of the feedback, wherein the visual representation of the feedback includes:
   a pruned graph of the one or more candidate clusters; and
   a visual representation of a selection of a most likely causal pathway in the pruned graph.

6. The computer-implemented method of claim 1, further comprising:
   determining, based on the additive noise model, a set of scores for each pathway in the one or more candidate clusters, wherein a respective score indicates a degree of causality associated with a pair of machines in a process flow with respect to a variable of interest; and
   displaying the set of scores associated with each pathway in the one or more candidate clusters.

7. The computer-implemented method of claim 1, wherein the processing system comprises one or more of:
   a manufacturing system;
   a cloud computing system; and
   a supply chain system.

8. The computer-implemented method of claim 1,
   wherein the graph represents a network topology corresponding to the processing system;
   wherein a respective node in the graph indicates, for a respective output, a machine which processes the respective output, a process associated with the machine, and a stop-code associated with the machine and the process; and
   wherein a respective edge in the graph indicates, for the respective output, a logical flow of a process from a source node to a target node;
   wherein a number indicated in the respective node in the graph corresponds to a machine number; and wherein a weight of a respective edge associated with the one or more candidate clusters in the graph indicates a degree of causality associated with the source node and the target node.

9. The computer-implemented method of claim 1, further comprising:
receiving, via a graphical user interface, a selection of one or more pathways in a visual representation of the graph.

10. The computer-implemented method of claim 1, wherein the outputs comprise materials and include physical objects upon which the machines of the processing system perform the processes, and
wherein a respective physical object is associated with a lot number and a production line of the processing system.

11. A computer system, comprising:
a processor; and
a storage device coupled to the processor and storing instructions which when executed by the processor cause the processor to perform a method, the method comprising:
receiving data associated with a processing system which includes a set of interconnected machines and an associated set of processes;
generating, based on the data, a graph indicating flows of outputs between the machines as part of the processes;
determining, based on a set of variables, one or more candidate clusters in the graph, wherein a candidate cluster is provided with one or more variables of interest;
performing, based on the one or more variables of interest, root cause analysis on the one or more candidate clusters by:
applying, based on the one or more variables of interest, an additive noise model to prune the one or more candidate clusters from the graph; and
determining, based on the pruned graph, a candidate pathway likely to cause an issue in at least one process, thereby facilitating improved efficiency in the processing system.

12. The computer system of claim 11, wherein the set of variables includes one or more of:
an issue associated with a respective machine;
a number of times a respective pathway including a group of machines is applied in the processing system;
redundant pathways applied;
a number of times maintenance event is performed on machines in a respective pathway; and
temporal information.

13. The computer system of claim 11, wherein the data includes timestamp information, machine status information, product-batch information, parts processed by different machines.

14. The computer system of claim 13,
wherein the product-batch information comprises a lot number which corresponds to a plurality of physical objects of the processing system, wherein the physical objects share at least one common characteristic, and
wherein the machine status information comprises one or more of an identifier of an issue and a fault type.

15. The computer system of claim 11, wherein the method further comprising:
providing a feedback, based on the candidate pathway, to indicate one or more root causes for a given stop-code;
displaying, via a graphical user interface, a visual representation of the feedback, wherein the visual representation of the feedback includes:
a pruned graph of the one or more candidate clusters; and
a visual representation of a selection of a most likely causal pathway in the pruned graph.

16. The computer system of claim 11, the method further comprising:
determining, based on the additive noise model, a set of scores for each pathway in the one or more candidate clusters, wherein a respective score indicates a degree of causality associated with a pair of machines in a process flow with respect to a variable of interest; and
displaying the set of scores associated with each pathway in the one or more candidate clusters.

17. The computer system of claim 11, wherein the processing system comprises one or more of:
a manufacturing system;
a cloud computing system; and
a supply chain system.

18. The computer system of claim 11,
wherein the graph represents a network topology corresponding to the processing system;
wherein a respective node in the graph indicates, for a respective output, a machine which processes the respective output, a process associated with the machine, and a stop-code associated with the machine and the process; and
wherein a respective edge in the graph indicates, for the respective output, a logical flow of a process from a source node to a target node;
wherein a number indicated in the respective node in the graph corresponds to a machine number; and
wherein a weight of a respective edge associated with the one or more candidate clusters in the graph indicates a degree of causality associated with the source node and the target node.

19. The computer system of claim 11, wherein the method further comprising:
receiving, via a graphical user interface, a selection of one or more pathways in a visual representation of the graph.

20. The computer system of claim 11, wherein the outputs comprise materials and include physical objects upon which the machines of the processing system perform the processes, and
wherein a respective physical object is associated with a lot number and a production line of the processing system.

* * * * *